Nov. 28, 1933.  H. DIEKE ET AL  1,937,057
FOLDING CAMERA
Filed March 1, 1932   2 Sheets-Sheet 1

INVENTORS,
HELLMUTH DIEKE,
ALOIS ZICK,
BY
ATTORNEY.

Nov. 28, 1933.   H. DIEKE ET AL   1,937,057
FOLDING CAMERA
Filed March 1, 1932   2 Sheets-Sheet 2

INVENTORS.
HELLMUTH DIEKE.
ALOIS ZICK.
BY
ATTORNEY.

Patented Nov. 28, 1933

1,937,057

UNITED STATES PATENT OFFICE 1,937,057

FOLDING CAMERA

Hellmuth Dieke, Johnson City, and Alois Zick, Binghamton, N. Y., assignors to Agfa Ansco Corporation, Binghamton, N. Y., a corporation of New York Application March 1, 1932. Serial No. 596,018

12 Claims. (Cl. 95—40)

Our invention relates to folding cameras and particularly to that type provided with mechanism for automatically erecting the front or lens carrier of a camera when the platform is lowered into picture taking position.

The principal object of our invention lies in the provision of a mechanism for automatically erecting the lens carrier and supporting it in rigid predetermined position when the camera is unfolded and which moves the lens carrier rearwardly into the camera body automatically when the platform is closed.

Another object of our invention lies in the provision of a novel locking means for the lens carrier in its erected position.

A further object of our invention lies in the provision of a locking means which is adjustable for proper contact with the lens carrier.

A further object lies in the provision of means for predetermining the position of the lens carrier supporting means.

Still another object lies in the provision of means for adjusting the tension on the supporting and locking means.

Other objects and advantages in details of construction will be apparent as the description proceeds, reference now being had to the figures of the accompanying drawings forming a part of this application and wherein like reference numerals indicate like parts.

Figure 1:
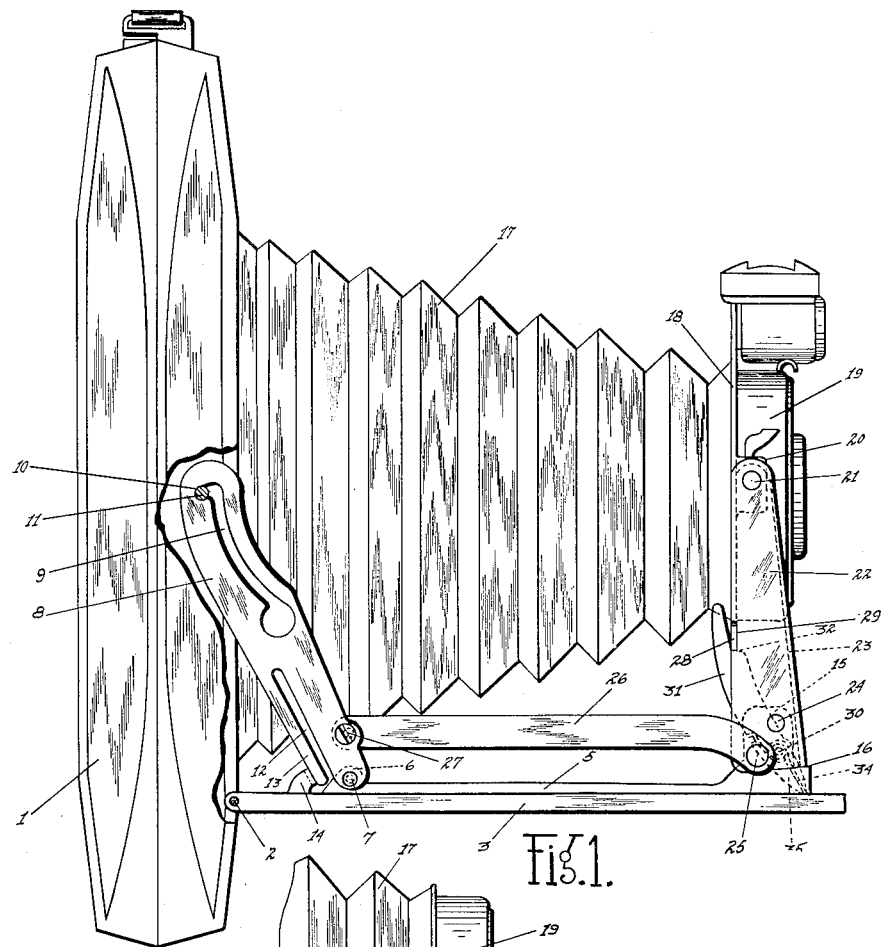
Figure 1 is a side view of a folding camera equipped with our invention.

The reference character 1 refers generally to a camera body which may be of any desired design. Pivoted to the body 1, as at 2, is the platform 3 of the camera adapted to be moved to the open position shown in Figure 1 or to the closed position shown in Figure 3.

Figure 4:
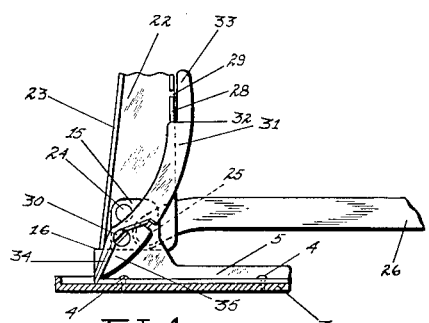
Figure 4 is a detail view partly in section illustrating the inner side of one of the folding and supporting devices.

Provided upon the platform 3, either integral therewith or, as shown clearly in Figure 4, secured thereto as by the rivets 4, are the supporting rails 5, one along each side edge of the platform 3 and extending substantially the entire length thereof.

Only one of these rails has been shown, but it will be understood that a duplicate is on the opposite side of the camera from that shown in the figures. Furthermore, it may be stated here that although the operating mechanism is illustrated on one side only of the camera, it is also duplicated in every respect on the opposite side.

The rails 5 are provided adjacent their rear ends with upstanding ears 6 to which are pivoted as at 7, the brace arms 8 provided at their opposite ends with elongated curved slots 9 terminating at their upper ends in offset notches 10. The camera body is provided with pins 11 engaging in the slots 9 and providing a pivot for the upper ends of the brace arms 8.

The lower ends of the brace arms 8 are provided with elongated open slots 12 forming spring fingers 13 adapted to resiliently engage, when the platform is lowered, with lugs 14 provided on the platform 3. When the platform 3 is lowered to the position shown in Figure 1, the pins 11 engage within the notches 10 at the upper ends of the brace arms 8, and provide a lock, under the tension of the spring arms 13, for holding the platform in such lowered position. When it is desired to close the platform, the operator merely presses inwardly on the upper ends of the brace arms 8, thus moving the arms rearwardly against the tension of the spring fingers 13, until the pins 11 disengage from the notches 10 and enter the slots 9. The platform may then be pivoted upwardly and in the completely folded position, the brace arms 8 assume the position shown in Figure 3 within the body of the camera.

The front ends of the supporting rails 5 are provided with upstanding ears 15 provided at their front ends with the shoulders 16 for a purpose to be described.

Secured at its rear end to the body of the camera 1 is a collapsible bellows 17 provided at its front end with a frame 18, upon which is mounted the lens carrier 19.

The frame 18 is provided on each side edge with forwardly extending ears 20 to each of which is pivoted, as at 21, supporting levers 22 provided along their front edge with inwardly turned flanges 23. Adjacent their lower ends, the supporting levers 22 are pivoted as at 24 to the upstanding ears 15, on the front ends of the supporting rails 5. These levers 22 are so positioned with respect to the ears 15 that when the levers are in their vertical position as shown in Figure 1, the bottom edges of the flanges 23 engage with the shoulders 16 on the ears 15, thus limiting the forward movement of the levers and providing them with a predetermined stop position.

Pivoted to the extreme lower end of the levers 22, as at 25, are the forward ends of arms 26 pivotally secured at their opposite ends as at 27, to the braces 8 adjacent their lower ends. The pivot members 27 are eccentrically mounted in the brace arms whereby the tension on the supporting levers 22 can be adjusted through the arms 26 against the spring fingers 13 of the brace arms 8.

Figure 3:
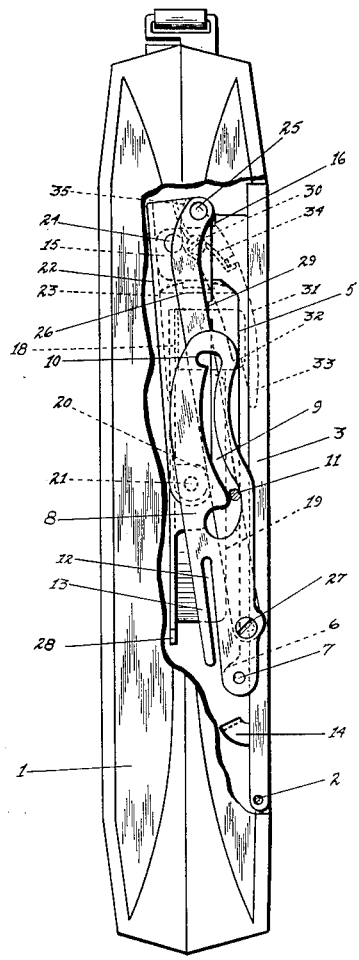
Figure 3 is a side view of the camera in closed position, the casing being broken away for clearness of illustration.

From the foregoing description it will be obvious that with the camera in its closed position as shown in Figure 3, when the platform 3 is moved downwardly about its pivot 2, the supporting arms 22, because of their pivotal connection to the platform, pull the lens carrier outwardly, and as the platform reaches its lowermost position, the flanges 23 on the supporting levers 22 engage with the shoulders 16 on the rails 5, bringing such levers to a fixed stop in vertical position for supporting the lens carrier in picture taking position. The arms 26 by virtue of their attachment to the brace arms 8, exert a pull inwardly or towards the camera on the extreme lower ends of the supporting levers 23, thus urging the upper ends of such levers outwardly to a vertical position. This force exerted by the arms 26, is during the last portion of the movement, against the tension of the spring arms 13. This spring tension is thus in a measure communicated to the supporting levers 22.

Figure 2:
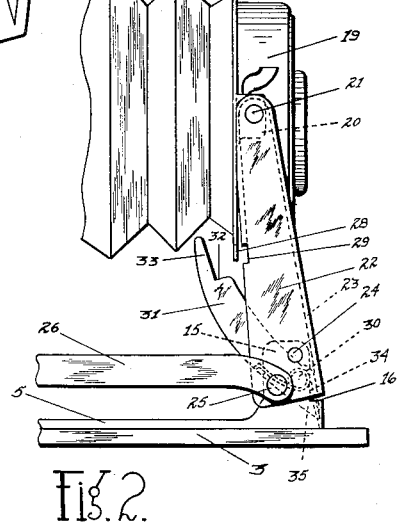
Figure 2 is a detail side view showing the lens carrier and support in one position.

It will be noted with reference to Figures 1 and 2 particularly, that the pivots 21 for the upper ends of the supporting ears 22 are slightly above the center line of the lens carrier. Consequently, the normal tendency of the lens carrier is to swing freely about the pivots 21 and by gravitation, the lower portion of the lens carrier normally swings slightly to the rear. We have provided positive means for moving the lens carrier to exact vertical position and maintaining the same in such position when the parts are completely unfolded as shown in Figure 1. This means will now be described.

The lower end of the carrier frame 18 is provided with a depending cross bar 28 extending laterally on each side a distance sufficient to be engaged at its ends by the supporting levers 22. These levers 22 are notched as at 29 for the purpose of receiving the ends of the cross bar 28 when the levers are in their vertical rigid position.

Pivoted to the upstanding ears 15 on the front ends of the supporting rails 5, as at 30, are arms 31. The pivots 30 are intermediate the ends of the arms 31 and the upper ends of such arms are shouldered as at 32 and provided with reduced bar engaging portions 33 extending upwardly back of the cross bar 28 in position to engage the same and press it forwardly into engagement with the notches 29 in the levers 22.

Springs 34 are coiled about the pivots 30 and are so positioned as to normally urge the levers 31 away from bar engaging position.

The extreme lower ends of levers 31 extend below and forwardly of the lower ends of the flanges 23 of the supporting levers 22, as at 35. The forward edges of these lower ends of the levers 31 are thus engaged by the lower ends of the flanges 23, the springs 34 normally maintaining such engagement. Obviously, as the supporting levers 22 are swung about their fixed pivots 24, and as the pivots 30 of the short levers 31 are offset from such fixed pivots 24, movement of the supporting levers 22 to their forward supporting positions, results in the flanges 23 rocking the short arms 31 on their pivots to bring the upper reduced ends 33 of such arms into engagement with the cross bar 28 and press it tightly into engagement with the levers 22. Obviously therefore, as the supporting levers 22 reach their vertical position, which is the limit of their forward movement, the short arms 31 engage and maintain the cross bar 28 into fixed engagement therewith, thus insuring the proper predetermined position of the lens carrier. The reduced ends 33 of the arms 31 renders them readily bendable forwardly or rearwardly for any slight adjustment which may be necessary for the proper engagement and positioning of the lens carrier.

Of course, changes may be made in details of construction and arrangement of parts without departing from the spirit and scope of our invention. We do not limit ourselves, therefore, to the exact form herein shown and described other than by the appended claims.

We claim:

1. A folding camera comprising a body, a platform hinged thereto, braces pivoted to said platform and having pivotal and sliding connection with said body, a lens carrier frame, supporting levers pivoted to said platform and said frame, and fixed means on said platform for limiting their movement in one direction.

2. A folding camera comprising a body, a platform hinged thereto, braces pivoted to said platform and having pivotal and sliding connection with said body, a lens carrier frame, supporting levers pivoted to said platform and said frame, and fixed shouldered means on said platform with which portions of said levers are engageable in one position to limit the movement of said levers in one direction.

3. A folding camera comprising a body, a platform hinged thereto, braces pivoted to said platform and having pivotal and sliding connection with said body, a lens carrier frame, supporting levers pivoted to said platform and said frame, and fixed shouldered means on said platform with which portions of said levers are engageable in one position to limit the movement of said levers in one direction, the shoulder engaging portions of said levers comprising lateral flanges on said levers.

4. A folding camera comprising a body, a platform hinged thereto, braces pivoted to said platform and having pivotal and sliding connection with said body, a lens carrier frame, supporting levers pivoted to said platform and said frame, fixed shouldered means on said platform with which portions of said levers are engageable in one position to limit the movement of said levers in one direction, and independent means on said levers engageable with said frame in one position for properly aligning said lens carrier.

5. A folding camera comprising a body, a platform hinged thereto, braces pivoted to said platform and having pivotal and sliding connection with said body, a lens carrier frame, supporting levers pivoted to said platform and said frame, fixed shouldered means on said platform with which portions of said levers are engageable in one position to limit the movement of said levers in one direction, and independent means on said levers engageable with said frame in one position for properly aligning said lens carrier, said means comprising levers pivoted to said supporting levers and rockable to frame engaging position by said supporting levers.

6. A folding camera comprising a body, a platform hinged thereto, braces pivoted to said platform and having pivotal and sliding connection with said body, a lens carrier frame, supporting levers pivoted to said platform and said frame, fixed shouldered means on said platform with which portions of said levers are engageable in one position to limit the movement of said levers in one direction, independent means on said levers engageable with said frame in one position for properly aligning said lens carrier, said means comprising levers pivoted to said supporting levers and rockable to frame engaging position by said supporting levers, said frame engaging levers being pivoted intermediate their ends, and means on said supporting levers for engaging one end of said frame engaging levers in one position to move them into frame engagement.

7. A folding camera comprising a body, a platform hinged thereto, braces pivoted to said platform and having pivotal and sliding connection with said body, a lens carrier frame, supporting levers pivoted to said platform and said frame, fixed shouldered means on said platform with which portions of said levers are engageable in one position to limit the movement of said levers in one direction, independent means on said levers engageable with said frame in one position for properly aligning said lens carrier, said means comprising levers pivoted to said supporting levers and rockable to frame engaging position by said supporting levers, said frame engaging levers being pivoted intermediate their ends, means on said supporting levers for engaging one end of said frame engaging levers in one position to move them into frame engagement, and means normally urging said frame engaging levers out of frame engagement.

8. A folding camera comprising a body, a platform hinged thereto, braces pivoted to said platform and having pivotal and sliding connection with said body, a lens carrier frame, supporting levers pivoted to said platform and said frame, fixed shouldered means on said platform with which portions of said levers are engageable in one position to limit the movement of said levers in one direction, independent means on said levers engageable with said frame in one position for properly aligning said lens carrier, said frame having a depending cross bar engageable by said means, and notches in said supporting levers to receive said cross bar.

9. A folding camera comprising a body, a platform hinged thereto, braces pivoted to said platform and having pivotal and sliding connection with said body, a lens carrier frame, supporting levers pivoted to said platform and said frame, fixed shouldered means on said platform with which portions of said levers are engageable in one position to limit the movement of said levers in one direction, independent means on said levers engageable with said frame in one position for properly aligning said lens carrier, said means comprising levers pivoted to said supporting levers and rockable to frame engaging position by said supporting levers, said frame engaging levers being pivoted intermediate their ends, and means on said supporting levers for engaging one end of said frame engaging levers in one position to move them into frame engagement, the frame engaging portions of said separate levers being reduced and bendable for slight adjustment.

10. A folding camera comprising a body, a platform hinged thereto, braces pivoted to said platform and having pivotal and sliding connection with said body, a lens carrier frame, supporting levers pivoted to said platform and said frame, fixed shouldered means on said platform with which portions of said levers are engageable in one position to limit the movement of said levers in one direction, independent means on said levers engageable with said frame in one position for properly aligning said lens carrier, said means comprising levers pivoted to said supporting levers and rockable to frame engaging position by said supporting levers, said frame engaging levers being pivoted intermediate their ends, means on said supporting levers for engaging one end of said frame engaging levers in one position to move them into frame engagement, and bars pivoted at one end to said supporting levers and at their opposite ends to said braces.

11. A folding camera comprising a body, a platform hinged thereto, braces pivoted to said platform and having pivotal and sliding connection with said body, a lens carrier frame, supporting levers pivoted to said platform and said frame, fixed shouldered means on said platform with which portions of said levers are engageable in one position to limit the movement of said levers in one direction, independent means on said levers engageable with said frame in one position for properly aligning said lens carrier, said means comprising levers pivoted to said supporting levers and rockable to frame engaging position by said supporting levers, said frame engaging levers being pivoted intermediate their ends, means on said supporting levers for engaging one end of said frame engaging levers in one position to move them into frame engagement, and bars pivoted at one end to said supporting levers and at their opposite ends to said braces, the pivots for said bars on said braces being eccentric whereby to adjust the tension on said supporting levers.

12. A folding camera comprising a body, a platform hinged thereto, braces pivoted to said platform and having pivotal and sliding connection with said body, a lens carrier frame, supporting levers pivoted to said platform and said frame, fixed shouldered means on said platform with which portions of said levers are engageable in one position to limit the movement of said levers in one direction, independent means on said levers engageable with said frame in one position for properly aligning said lens carrier, said means comprising levers pivoted to said supporting levers and rockable to frame engaging position by said supporting levers, said frame engaging levers being pivoted intermediate their ends, means on said supporting levers for engaging one end of said frame engaging levers in one position to move them into frame engagement, and bars pivoted at one end to said supporting levers and at their opposite ends to said braces, the pivots for said bars on said braces being eccentric whereby to adjust the tension on said supporting levers, said braces having spring fingers placing said braces under tension in their bracing position.

ALOIS ZICK.
HELLMUTH DIEKE.